(12) United States Patent
Semenenko

(10) Patent No.: US 6,305,443 B1
(45) Date of Patent: Oct. 23, 2001

(54) APPARATUS AND SYSTEM FOR HANDLING MATERIAL

(75) Inventor: Ivan Semenenko, Moreton-in-Marsh (GB)

(73) Assignee: Matcon (R&D) Limited, Gloucestershire (GB)

( * ) Notice: Subject to any disclaimer, the term of this patent is extended or adjusted under 35 U.S.C. 154(b) by 0 days.

(21) Appl. No.: 09/402,353

(22) PCT Filed: Apr. 14, 1998

(86) PCT No.: PCT/GB98/01084

§ 371 Date: Jan. 27, 2000

§ 102(e) Date: Jan. 27, 2000

(87) PCT Pub. No.: WO98/46505

PCT Pub. Date: Oct. 22, 1998

(30) Foreign Application Priority Data

Apr. 15, 1997 (GB) .................................................. 9707641

(51) Int. Cl.[7] ........................................................ B65B 1/04
(52) U.S. Cl. .............................. 141/346; 141/301; 141/67; 141/65
(58) Field of Search ...................................... 141/301, 346, 141/364, 365, 363, 310, 285, 67, 65, 59

(56) References Cited

U.S. PATENT DOCUMENTS

| | | | | |
|---|---|---|---|---|
| 4,825,913 | * | 5/1989 | Stott | 141/59 |
| 5,263,521 | * | 11/1993 | Brossard et al. | 141/384 |
| 5,490,546 | * | 2/1996 | Lhoest | 141/346 |
| 5,775,544 | * | 7/1998 | Semenenko | 141/349 |
| 5,810,060 | * | 9/1998 | Bolz et al. | 141/97 |

* cited by examiner

Primary Examiner—Steven O. Douglas
(74) Attorney, Agent, or Firm—Miles & Stockbridge P.C.

(57) ABSTRACT

The invention relates to apparatus (1) for handling flow of particulate material from one location such as a first station such as a filling head (2) attached to an IBC (3) and a chamber (4) which is in association with the filling head (2) by being slidably mounted round an outlet (8) thereof, the chamber (4) having an orifice (6) through which the another station such as an IBC (7) and the one station (23) are operatively connected to provide a transfer system for the material (8). The chamber (4) has a device (9) which is operable to remove a closure element (10) of the IBC (7). The chamber (4) also has means (11, 12) to extract material from the chamber (4) so that the exterior of the filling head (2) and IBC (7) remains in use free of any potentially contaminating material, such as specks of material.

21 Claims, 6 Drawing Sheets

APPARATUS AND SYSTEM FOR HANDLING MATERIAL

Figure 1:
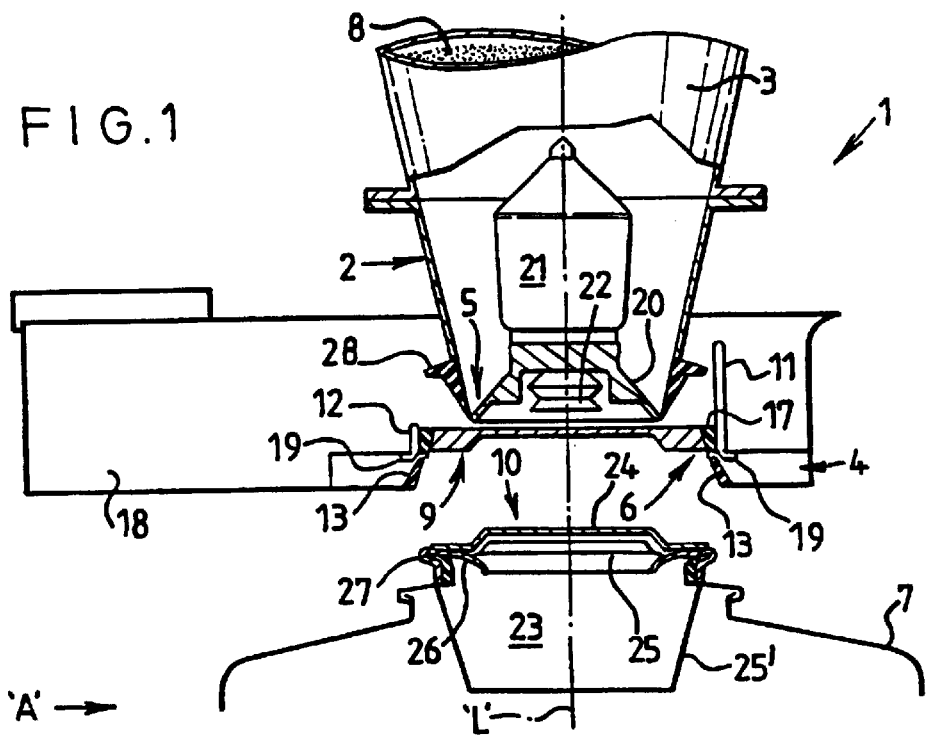

The invention relates to an apparatus and a system for handling material, particularly the flow of or transfer of a flowable particulate material from one station to another.

It is often necessary to transfer material such as powder from one station which may be a process station or a storage station to another location such as a point of use or for transport to another location or station entirely. The one station can be a silo, hopper or the like and the other station may be an Intermediate Bulk Container (IBC). In prior systems, mating surfaces of the silo and IBC are brought together, there being alpha-beta flanges to keep the mating surfaces clean. Like all such physical systems there is a limitation in that the fine outer edge of a transfer valve will often have a fraction of a gramme of powder material or product retained on it after use and thus the next time an IBC is brought into position for a transfer of material from the silo, this trace of product could dislodge and fall onto the top surface of the IBC, thereby contaminating it, and therefore potentially the surrounding environment.

For most applications this tiny amount of product on the bottom edge of the transfer valve is well within the acceptable limits of material in the atmosphere. However, for some industries and sensitive applications such as the secondary pharmaceutical industries where the product may contain active ingredient, even this tiny level of exposed product and the risk of it dislodging from a valve onto the top surface of the IBC is not acceptable.

It is accordingly an object of the invention to seek to mitigate this disadvantage.

According to a first aspect of the invention there is provided apparatus for handling flow of flowable particulate material from one station to another, comprising a chamber adapted for mounting in association with the one station and having an orifice through which the another station and the one station are operatively connectible for transfer of material, there being a device which in one position closes the orifice and which is operable to remove a closure element of the another station for transfer, and means to extract material from the chamber, the arrangement being such that particulate material in the chamber is extracted therefrom by the extraction means so that the exterior of the stations remain in use free of the material.

The device may be adapted to engage and lift a closure element of the another station therefrom. This provides a relatively simple yet efficient apparatus.

The device may have means to lock it to the closure element for lifting thereof. This provides for a safe lift, particularly where the locking means may be a suction means. This construction provides for a positive "in-off" lift.

The suction means may comprise a vacuum means whereby the device and the closure element may be in use vacuum locked together. The device may be reciprocably movable from the one position to a second position remote from the orifice whereby to obturate and expose the orifice. This provides a compact construction.

The device may be slewible in a plane transverse to a major axis of the orifice to expose the orifice. This, again, provides a compact structure, and an efficient use of space.

The device may be complementary in shape to the external profile of the closure element. This construction provides for positive engagement and an efficient lifting of the closure element.

The device may have a concave dished shape in transverse section.

The extraction means may comprise means to admit a flow of cleaning gas into the chamber. This is an efficient way of removing particles which become entrained in the gas, which may for preference be air which may provide a continuous air flow sweep through the chamber.

Alternatively, the extraction means may comprise a suction means such as for example a fan or fans.

According to a second aspect of the invention, there is provided a system for transferring flowable particulate material from one station to another, comprising a first station and a second station having respective outlets and inlets which are substantially in line, and apparatus as hereinbefore defined.

The first and second stations may be substantially vertically arranged and the apparatus may be engaged round the outlet of the first station. This provides for efficient transfer of a material using gravity.

The apparatus may be slidably mounted with respect to the first station. This provides for sealing of the system whilst allowing relative movement between the respective parts thereof.

There may be means to raise and lower the second station with respect to the first station. This provides the relative movement, and a relatively simple, controllable operation, particularly where the means may comprise a lifting table.

The second station may have a lid comprising a first closure element and a second closure element and the apparatus may be operable to remove and replace the first closure element for a transfer operation. This provides for containment of material.

The first and second closure elements of the second station may be operative to close a filling aperture of the second station, the second closure element being in use in the aperture.

The second closure element may be supported by a flexible and resilient annular seal member. This is essentially a lip seal which is operative to retain material in the second station.

The first station may comprise means to obturate and expose the aperture of the second station. This is a relatively simple yet efficient construction as the operative parts are self-contained, particularly when there may be a device for raising and lowering the second closure element of the second station.

The device may comprise a suction device, which itself may be raisable and lowerable with a valve device which is operative to obturate and open the outlet of the first station. As before this construction provides a self-contained system.

The valve may comprise a conical or frusto-conical valve device of the first station.

The apparatus may comprise a plenum chamber which may enclose the outlet and inlet during transfer.

An apparatus and a system embodying the invention, for transfer or flow of a particulate flowable material from one station to another or second station are hereinafter described, by way of example, with reference to the accompanying drawings.

FIGS. 1 to 13 show schematically in side elevation an operating sequence during transfer of material from one station to another using an apparatus and system according to the invention.

Referring to the drawings there is shown apparatus 1 for handling flow of particulate material from one location such as a first station such as a filling head 2 attached to a silo or hopper 3 and a chamber 4 which is in association with the filling head 2 by being slidably mounted round an outlet 5 thereof, the chamber 4 having an orifice 6 through which the another station such as an IBC 7 and the one station 2,3 are operatively connected to provide a transfer system for the material 8. The chamber 4 has a device 9 which is operable to remove a closure element 10 of the IBC 7. The chamber 4 also has means 11, 12 to extract material from the chamber 4 so that the exterior of the filling head 2 and IBC 7 remains in use free of any potentially contaminatig material, such as specks of material.

The chamber 4 is in the embodiment a closed plenum chamber, the orifice 6 being centrally arrangeded, there being an annular seal 13, defining the orifice with a depending lip 14 of a wall 15 of the chamber 4.

The device 9 which closes the orifice 6 in the one position shown in FIG. 1 is vertically above the seal 13. The device 9 is a lid or tray which is of concave dish configuration is shown. The device 9 has a seal 17. There is a mechanism, not shown, for moving the device 9 as by slewing or rotation to a protective cowl or housing 18 which encloses the chamber 4 and which is laterally displaced from the orifice 6. In order to provide extraction of air and any extraneous particles from the chamber and in use from the stations, a swirl of cleaning gas in the form of air is provided in the chamber by way of the pipes 11, 12. The pipe 11 is an inlet pipe and the pipe 12 an outlet pipe, or vice-versa, each one having a nozzle 19 pointing away from the orifice 6 whereby to provide a toroidal swirl of air in the chamber 9 from inlet nozzle to outlet nozzle. The pipes 11, 12 also form in the embodiment a guide for the device 9, which itself has means, in the embodiment a vacuum suction means by which the closure element 10 of the second station or IBC can be raised from the IBC, the suction means comprising a series of peripheral holes round the device 9.

The first station 2, 3 comprises the silo or hopper 3 to which is secured as by bolting, the filling head 2 which has the outlet 5 which is obturated and opened by a valve 20 in the form of for example a cone valve which is raised and lowered by a device such as a bellows 21. Interiorly of the valve 20 is a means 22 for opening and closing the closure device 10 of the IBC 7. The means 22 in this embodiment of the invention is a suction device in the form of a vacuum head, however it will be appreciated that other devices known in the art, such as for example those functioning by magnet could be used.

The second station or IBC 7 has an inlet 23 which is closed by the closure device 10 in the form of an outer and inner (as viewed) closure element 24, 25 above a lid catchment cage 25'. The inner element 25 is a primary lid and is supported in the inlet in this embodiment of the invention by a flexible and resilient annular seal, or lip seal 26. The outer element 24 is a secondary lid and sits on the outer surface of the lip seal 26 and is supported on an upstanding wall 27 defining the inlet 23. The outer closure element 24 is of inverted dished shape. The device 9 of the chamber is of complementary shape to the shape of the outer closure element 24.

The central major arm of the orifice 6 and outlet 5 of the first station 2, 3 are vertically aligned.

In operation to transfer a flowable particulate material from the first station (or silo) to the second station 7, the second station 7 is brought into position below (as viewed in the Figures and as in use) the chamber 4 and the first station 2,3. This action is shown by arrow 'A' in FIG. 1, the central longitudinal axis of the second station or IBC being in line with the central longitudinal or major axis of the silo and plenum chamber. The respective central axes are thus co-linear as shown by the chain dashed line 'L' in the Figures.

The IBC 7 is placed on a lift table (not shown) below the apparatus comprising the first silo and chamber and is raised thereby until its closure element, or secondary lid 24, engages in the device 9 of the chamber 4, the respective complementary dish configurations thereof ensuring a smooth and snug engagement. The upstanding wall 27 defining the inlet 23 engages in the orifice or opening 6 in the chamber 4 at the top of the seal 13 and butts against the free edge of the depending annular flange 14.

Figure 2:
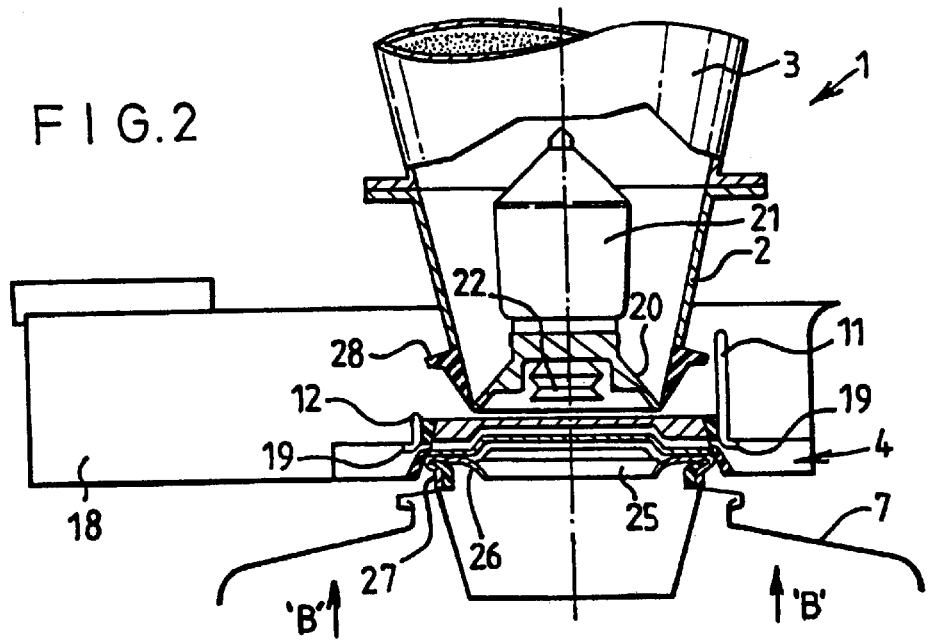
Figure 3:
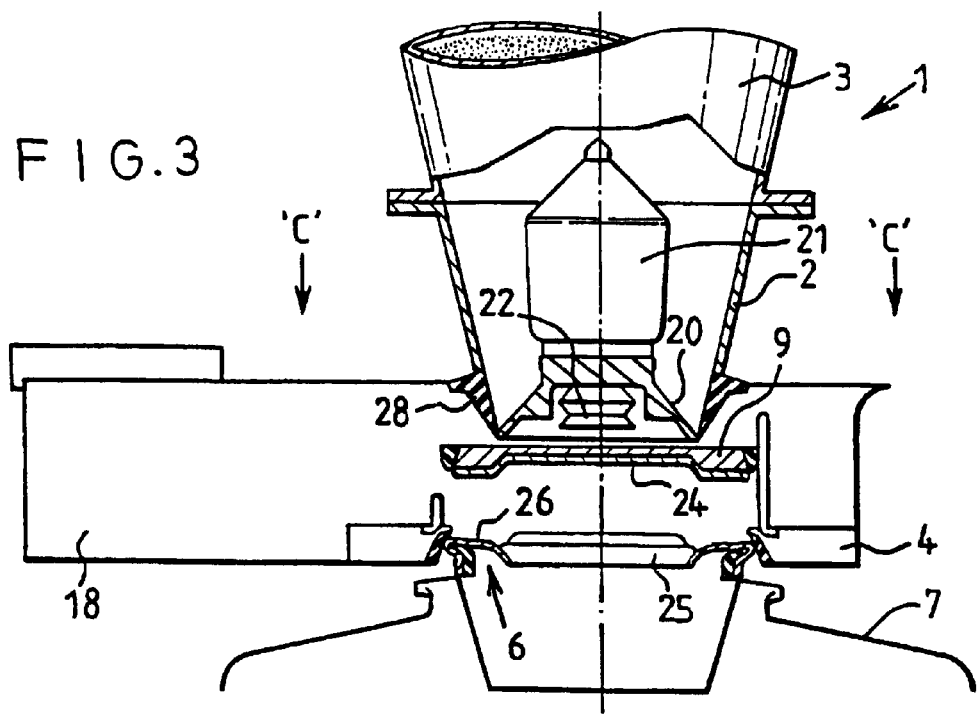
Figure 4:
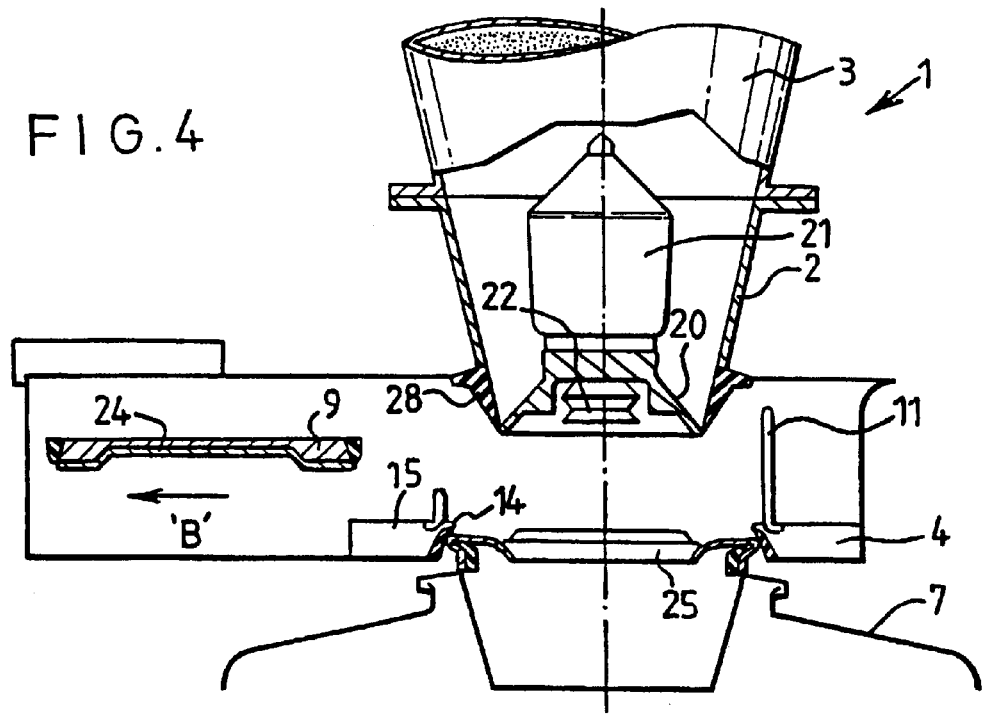
Figure 5:
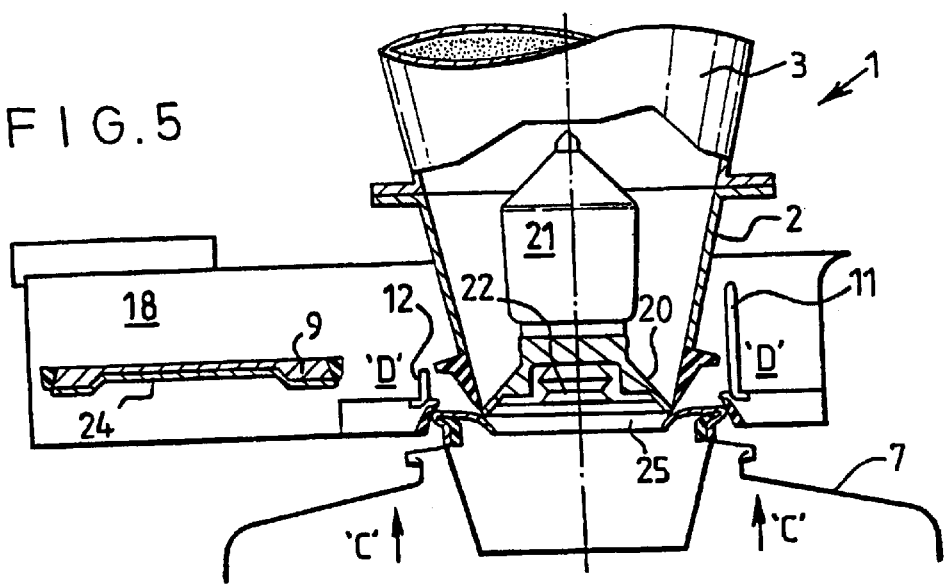

The suction means of the device 9 is actuated to lock the device 9 and secondary lid 24 firmly together (FIG. 2).

The IBC 7 and the chamber 4 are then lowered together (FIG. 3), a boundary edge of the housing 18 engaging a seal 28 on the outer surface of the outlet 5 of the filling-head 2 attached to the silo 3. The secondary lid 24 remains locked together with the device 9 and the IBC remains engaged within the chamber aperture 6. The device 9 and secondary lid 24 forming a unit, are then moved to one side, arrow 'B' in FIG. 4, as by stewing or rotation, into the protective housing or cowl 18. The main or primary lid 25 of the IBC 7 is thus exposed to the outlet 5 of the silo which is directly above it. However, during the operations described, the chamber is swept by a continuous sweep of air flow in a circuit between the pipes 11, 12 and the interior of the chamber 4 so any particulate material is collected in this air flow and extracted, thereby obviating lodging of particles of the material on the lid 25.

Figure 6:
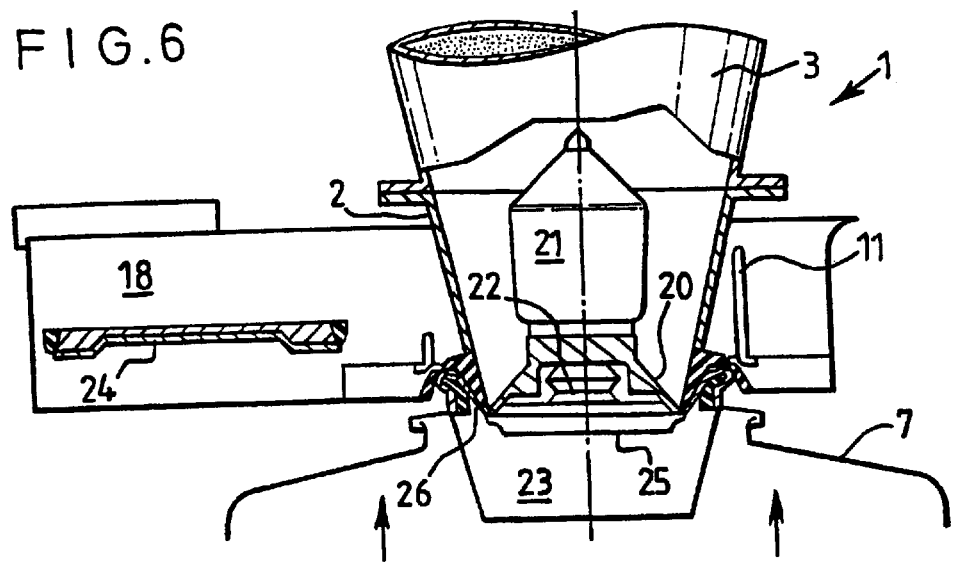

The IBC 7 and the chamber 4 are then fully raised (as shown by the arrows 'C' in FIG. 5) until it engages the outlet 5 of the silo, the boundary edge of which engages the lip seal 26 supporting the primary lid 25. A jet or jets of air are injected in the direction of the arrow 'D' in FIG. 5 to ensure that no particles are lodged at the outlet 6. Continued raising of the IBC 7 and chamber 4 ensure full engagement of the lip seal 26 and outlet 5, the lip seal 26 flexing to allow this engagement, the suction means 22 of the outlet 5 of the silo 3 engaging the primary lid 25 and holding it (FIG. 6)

Figure 7:
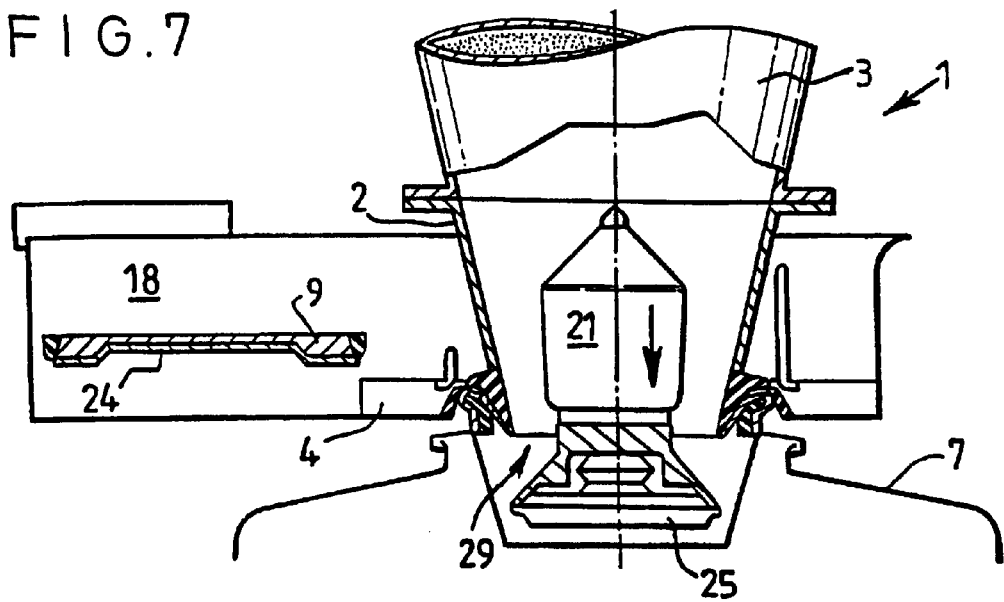
Figure 8:
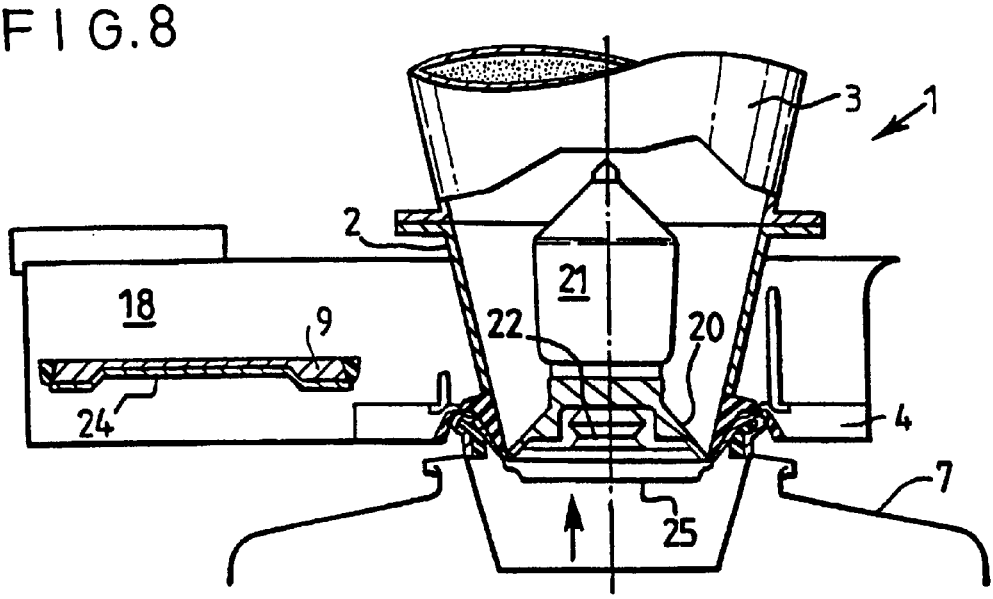

The cone valve 20 of the silo 3, with the suction head 22 supporting the primary lid 25 of the IBC 7, is lowered to allow particulate material to flow from the silo through the chamber to the IBC, through an annular opening 29 opened by this action, as shown in FIG. 7. After transfer of the desired amount of the material to the IBC, the cone valve 20 is closed, thereby replacing the primary lid (FIG. 8).

Figure 9:
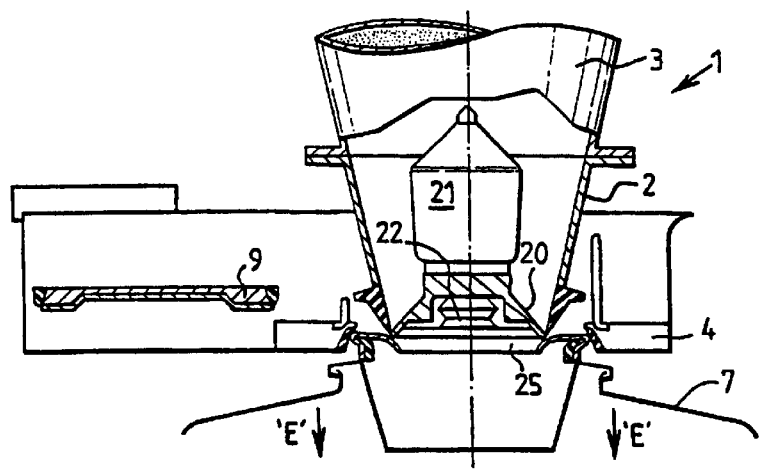
Figure 10:
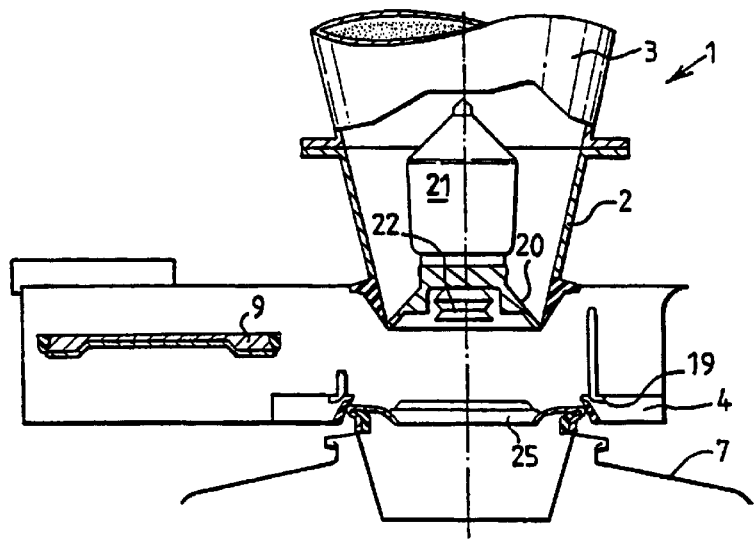
Figure 11:
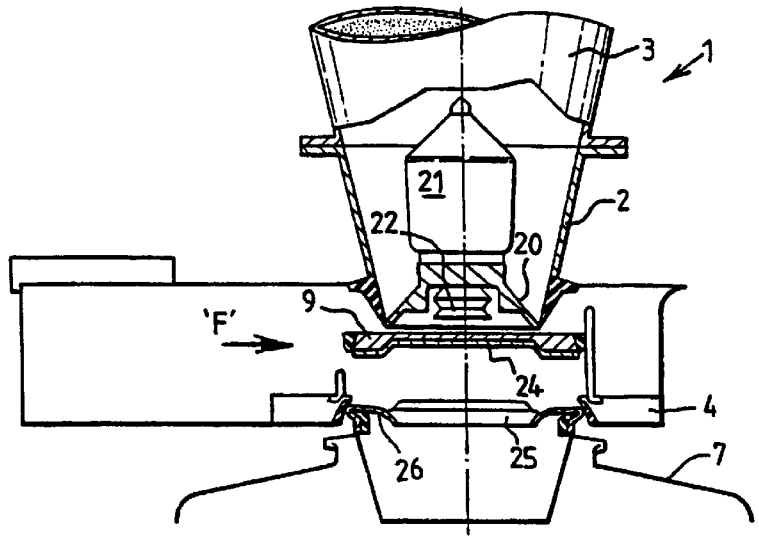
Figure 12:
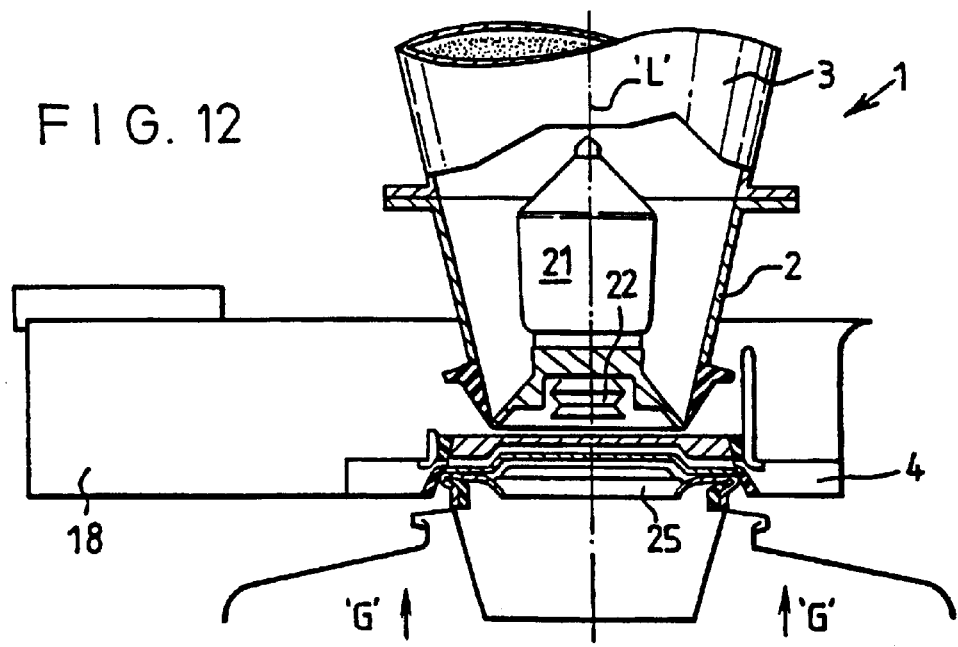
Figure 13:
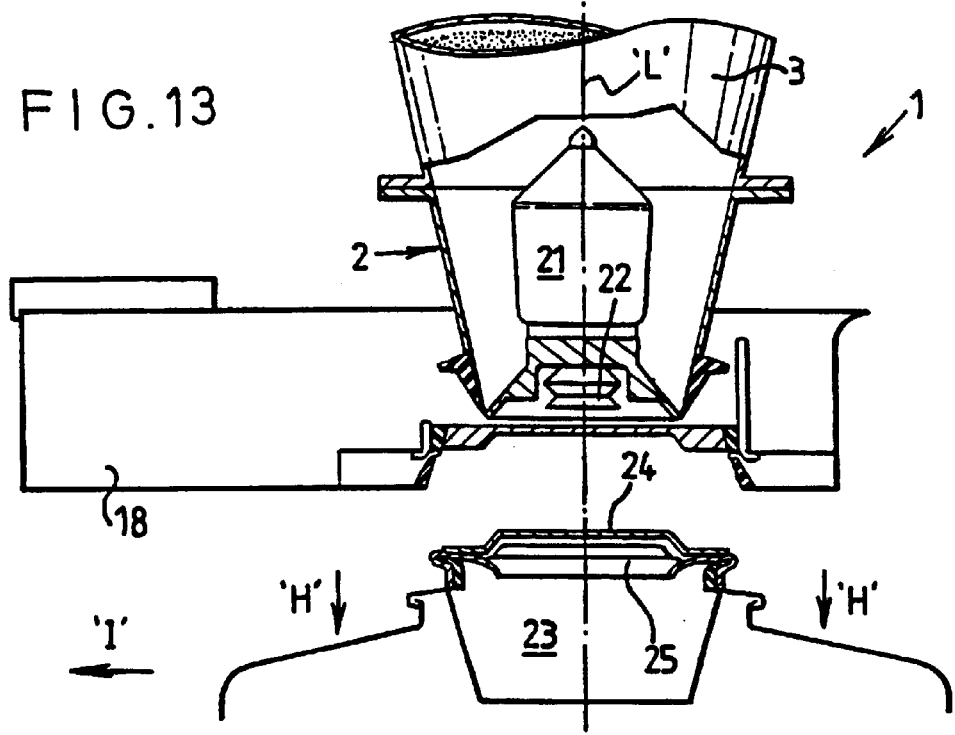

After the transfer of the material, the IBC 7 and chamber 4 are lowered sufficiently for the primary lid 25 to be supported again by the lip seal 26 which flexes to effect the support described. This is shown in FIG. 9. The IBC 7 and plenum chamber 4 are shown fully lowered in FIG. 10 (arrows 'E', FIG. 9). The device 9 and secondary IBC lid 24 are then moved back to be above the inlet of the IBC (arrow 'F', FIG. 11).

The IBC 7 is raised enough (arrows 'G', FIG. 12) to re-engage the secondary lid 24, and the vacuum source is de-activated. This releases the secondary IBC lid 24 and replaces it on top of the wall 27 of the IBC. The IBC 7 is then lowered (arrows 'H', FIG. 13), weight checked, and moved away (arrow 'I', FIG. 13). The IBC 7 can be removed with no trace of material on any top surface, and the apparatus 1 is ready for another sequence of transfer operations, FIG. 13 being equivalent to FIG. 1.

In a further embodiment of the invention, (not illustrated) the silo 3 may be provided with a valve 20 which is opened by raising it into the filling head 2 by known means such as a bellows, rather than lowering it. The illustrated sequence of events for this embodiment is similar to that for the previous embodiment, except that when the apparatus is in the position shown in FIG. 6, with the suction head 22 engaged on the primary lid 25 and holding it, the valve 20 is raised, rather than lowered as it is in FIG. 7. The device 22, plus primary lid 25 is thus raised clear of the seal 26 allowing product to flow. The device 22 can be modified if necessary to move upwards independently of the valve 20, and the primary lid 25 can be seated on the lip of the IBC rather than on the lip seal 26, with the provision of suitable seal means there around.

Thus using an apparatus 1 and system as shown herein and described with reference to the drawings, any dislodged material falling into the plenum chamber will be swept to extraction.

What is claimed is:

1. A system for transferring flowable particulate material from one station to another, comprising a first station and a second station having respective outlets and inlets which are substantially in line, and apparatus for handling flow of the flowable particulate material from the first station to the second station interposed therebetween, said apparatus comprising a chamber adapted for mounting in association with the first station and having an orifice through which the second station and the first station are operatively connectable for transfer of material, there being a device which in one position closes the orifice and which is operable to remove a closure element of the second station and there being means to extract material from the chamber, the arrangement being such that particulate material in the chamber is extracted therefrom by the extraction means so that the exterior of the stations remains, in use, free of the material, the second station having a lid comprising a first closure element and a second closure element, the apparatus being operable to remove and replace the first closure element for a transfer operation.

2. A system according to claim 1, the first and second closure elements of the second station being operative to close a filling aperture of the second station, the second closure element being, in use, in the aperture.

3. A system according to claim 2, the second closure element being supported by a flexible and resilient annular seal member.

4. A system according to claim 3, the first station comprising means to obturate and expose the aperture of the second station.

5. A system according to claim 4, comprising a device for raising and lowering the second closure element of the second station.

6. A system according to claim 5, the raising and lowering device comprising a suction device.

7. A system according to claim 6, the suction device being raisable and lowerable with a valve device which is operative to obturate and open the outlet of the first station.

8. A system according to claim 7, the valve device comprising a conical or frusto-conical valve device.

9. A system according to claim 1, the apparatus comprising a plenum chamber which encloses the outlet of the first station and the inlet of the second station during transfer.

10. A system according to claim 1, the first and second stations being substantially vertically arranged and the apparatus being engaged round the outlet of the first station.

11. A system according to claim 10, the apparatus being slidably mounted with respect to the first station.

12. A system according to claim 11, the first and second stations being mounted for respective reciprocable relative motion.

13. A system according to claim 12, there being means to raise and lower the second station with respect to the first station, or to raise and lower the first station with respect to the second.

14. A system according to claim 13, the means to raise and lower comprising a lifting table.

15. A system for transferring flowable particulate material from one station to another, comprising a first station having an outlet and a second station having an inlet, and apparatus for handling flow of the flowable particulate material from the first station to the second station, said apparatus comprising a chamber adapted for mounting in association with the first station and having an orifice through which the second station and the first station are operatively connectable for transfer of material, there being a device which in one position closes the orifice and which is operable to remove a closure element of the second station and there being a device to extract material from the chamber, the arrangement being such that particulate material in the chamber is extracted therefrom by the extraction device so that the exterior of the stations remains, in use, free of the material, the second station having a lid comprising a first closure element and a second closure element, the apparatus being operable to remove and replace the first closure element for a transfer operation.

16. A system according to claim 15, the first and second closure elements of the second station being operative to close a filling aperture of the second station, the second closure element being, in use, in the aperture.

17. A system according to claim 16, the second closure element being supported by a flexible and resilient annular seal member.

18. A system according to claim 16, comprising a device operative to raise and lower the second closure element of the second station.

19. A system according to claim 18, the raising and lowering device comprising a suction device.

20. A system according to claim 19, the suction device being raisable and lowerable with a valve device which is operative to obturate and open the outlet of the first station.

21. A system according to claim 15, the apparatus comprising a plenum chamber which encloses the outlet of the first station and the inlet of the second station during transfer.

* * * * *